(12) United States Patent
Coil et al.

(10) Patent No.: US 9,406,035 B2
(45) Date of Patent: Aug. 2, 2016

(54) SYSTEM AND METHOD OF COMMUNICATIONS

(75) Inventors: Jeffrey Coil, Marion, IA (US); Jamie Scherkenbach, Cedar Rapids, IA (US); James Trainor, Cedar Rapids, IA (US); Roland Kane, Central City, IA (US)

(73) Assignee: TRAPEZE SOFTWARE INC., Ontario (CA)

( * ) Notice: Subject to any disclaimer, the term of this patent is extended or adjusted under 35 U.S.C. 154(b) by 725 days.

(21) Appl. No.: 12/010,767

(22) Filed: Jan. 30, 2008

(65) Prior Publication Data

US 2008/0182606 A1     Jul. 31, 2008

(30) Foreign Application Priority Data

Jan. 31, 2007    (CA) .................................... 2576535

(51) Int. Cl.
   *H04M 1/00*      (2006.01)
   *G06Q 10/06*     (2012.01)
   *H04W 4/04*      (2009.01)

(52) U.S. Cl.
   CPC . *G06Q 10/06* (2013.01); *H04W 4/04* (2013.01)

(58) Field of Classification Search
   USPC ............... 455/569.2, 424, 425, 426.1, 552.1, 455/414.1, 445
   See application file for complete search history.

(56) References Cited

U.S. PATENT DOCUMENTS

| | | | |
|---|---|---|---|
| 5,946,611 A * | 8/1999 | Dennison et al. | 455/404.2 |
| 6,324,404 B1 * | 11/2001 | Dennison | H04B 7/18541 455/406 |
| 6,370,381 B1 | 4/2002 | Minnick et al. | |
| 7,113,127 B1 * | 9/2006 | Banet et al. | 342/357.31 |
| 2002/0006806 A1 * | 1/2002 | Kinnunen et al. | 455/550 |
| 2003/0092383 A1 | 5/2003 | Moles et al. | |
| 2003/0114187 A1 * | 6/2003 | Jackson | 455/552 |
| 2004/0230345 A1 * | 11/2004 | Tzamaloukas | 701/1 |
| 2005/0239497 A1 * | 10/2005 | Bahl et al. | 455/552.1 |
| 2005/0250496 A1 * | 11/2005 | Hason et al. | 455/436 |
| 2007/0142050 A1 * | 6/2007 | Handforth et al. | 455/436 |

* cited by examiner

*Primary Examiner* — Justin Lee
(74) *Attorney, Agent, or Firm* — Dinesh Agarwal, P.C.

(57) ABSTRACT

The present invention relates to a system and method of providing communications for a mobile vehicle, comprising: a) providing the vehicle with the ability to communicate using a number of different communications methods; b) establishing a list of parameters, said list of parameters defining a set of criteria for determining the preferred attributes of the communications method to be used at any given time; and c) selecting a communications method based on said list of parameters.

17 Claims, 2 Drawing Sheets

SYSTEM AND METHOD OF COMMUNICATIONS

FIELD OF THE INVENTION

The present invention relates to the field of communications. In particular, it relates to a system and method of providing continuous communication services to one or more mobile vehicles using a variety of available communications methods and a parameter-based system for determining the optimal communications method.

BACKGROUND OF THE INVENTION

One of the primary concerns in operating a network of mobile vehicles, such as buses in a transit network, is a reliable system of communications between the vehicles and the central dispatching station or headquarters. Of primary concern is maintaining communications without disruption from geographic features, such as hills, radio towers, and large buildings. Another concern is the load on the system, particularly the channels available, as the number of vehicles increases.

One known system of maintaining communications is to use some form of channel-switching procedure that engages additional channels as required to deal with the traffic load. To ensure geographic coverage, a procedure of switching channels to handle traffic load and switching to different relay towers for increased range, such as that shown in U.S. Pat. No. 6,370,381 issued to Minnick et al., may be used.

In some cases, a backup system is also provided in the event that the primary communications system is unavailable. The backup system may operate using the same communications method or, rarely, using a different communications method from the primary system.

However, given that scope of potential options for communications systems, as well as the increased demands for both bandwidth and channel, a more sophisticated and robust communications system is needed. Ideally, such a communications system would be capable of selecting from a wide range of different communications methods to provide for increased compatibility and reliability.

Furthermore, any such communications system is ideally capable of engaging in the method selection process according to parameters set by the end user and being capable of customized for specific vehicles and specific classes of vehicles.

It is an object of this invention to partially or completely fulfill one or more of the above-mentioned needs.

SUMMARY OF THE INVENTION

According to an aspect of the present invention, there is provided a system and method of providing communications for a mobile vehicle, comprising: a) providing the vehicle with the ability to communicate using a number of different communications methods; b) establishing a list of parameters, said list of parameters defining a set of criteria for determining the preferred attributes of the communications method to be used at any given time; and c) selecting a communications method based on said list of parameters.

Preferably, the system includes a configurable override, enabling manual selection of the communications method by the vehicle operator. Also preferably, the parameters of the communications methods used for selection include bandwidth, work flow, quality of signal, signal range, monetary cost, and the location of the vehicle.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE PREFERRED EMBODIMENTS

Figure 1:
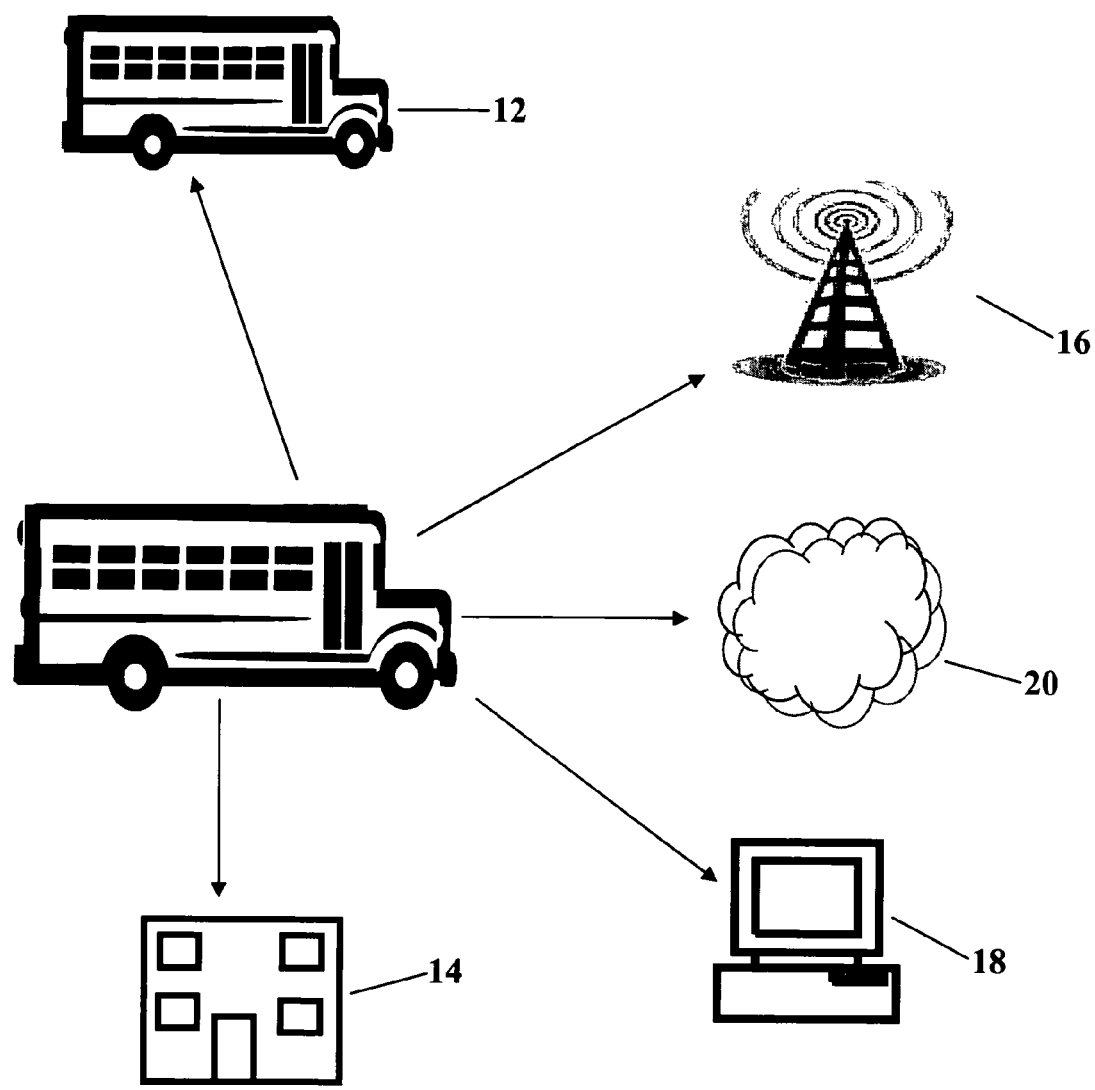
FIG. 1 is diagram of the various entities present in a communications network.

In accordance with FIG. 1, a vehicle 10, such as a bus, is required to communicate with various other entities, including other vehicles 12, dispatch station 14. The communication may also require contacting various intermediaries to ensure signal integrity, such as a relay tower 16, a computer network 18, or even general radio transmissions 20. A communications module is mounted on the vehicle and is responsible for handling all communications requests between the vehicle and these different entities and intermediaries. One of the potential issues is that communication with different entities can require the use of different communications methods. For example, vehicle-dispatch communications may be by two-way radio, whereas the vehicle logs into a network via WLAN for maintenance and updates of on-board software or records.

The module selects a communications method and necessary operating conditions (frequency, channel, etc.) for use by the vehicle based on pre-loaded parameters for that vehicle and the communication. The parameters are set and determined by the needs of the authority operating the vehicle (e.g. a transit authority). For example, certain vehicles, such as regular route buses, may be set to operate with priority given to the communications method with the lowest monetary cost condition, independent of signal quality, whereas other, more specialized vehicles, such as wheel-trans or similar specialized services may be set to operate with priority given to the communications method with maximum signal strength and reception condition, regardless of monetary cost factors.

The module switches communications dynamically in accordance with these internal parameters as required by the vehicle operator. The parameters can be further defined to address the priorities of the vehicle's operator and can be set for a specific class of vehicles or specific vehicle, as desired, or for a particular vehicle.

The parameters are used to determine which communications method is best suited to meet the requirements of the vehicle (as determined by the authority). The module selects that communications method so identified. Secondary and tertiary communications methods can also be determined for use in the event of a failure in the primary communications method.

Communications methods are transparent to the system in terms of radio methods. The system functionality views all methods as a network connection and therefore is not concerned with the underlying technology. Methods used for example could include: Private Mobile Radio, Public cellular (TDMA, CDMA, GSM), 802.x, Wireless Local Area Networks (WLAN), Satellite, MESH networks (proprietary and standards-based).

Parameters are set based on the requirement of the particular vehicle and dispatcher. Typical parameters are monetary cost and signal quality (range and strength). Other parameters, such as location (vehicle and tower), bandwidth and vehicle status are also useful. The parameters can be structured into a hierarchy, representing primary and secondary factors in determining the communications method.

Parameters can be simple or complex, as necessary. For example, location may be set as the first parameter, however, it may be limited to determining if a vehicle is in a depot or other fixed location before proceeding to check further parameters. Monetary cost is another simple parameter, as access to certain communications systems and/or networks may require paying a premium that is not justified in the majority of situations. Signal strength is typically a high-priority parameter, as ensuring reliable communications is one of the objectives of the system herein. Signal range is similar to signal strength and is useful as a separate parameter or in conjunction with signal strength. These two parameters may be more complex, as different combinations of signal strength and range may favor different networks. For example, a strong, short-range signal may be preferred over a weaker, long-range signal for certain applications and the reverse for others. Bandwidth is another complex parameter, as certain operations and applications may consume more bandwidth and demand a communications method that can supply it.

Figure 2:
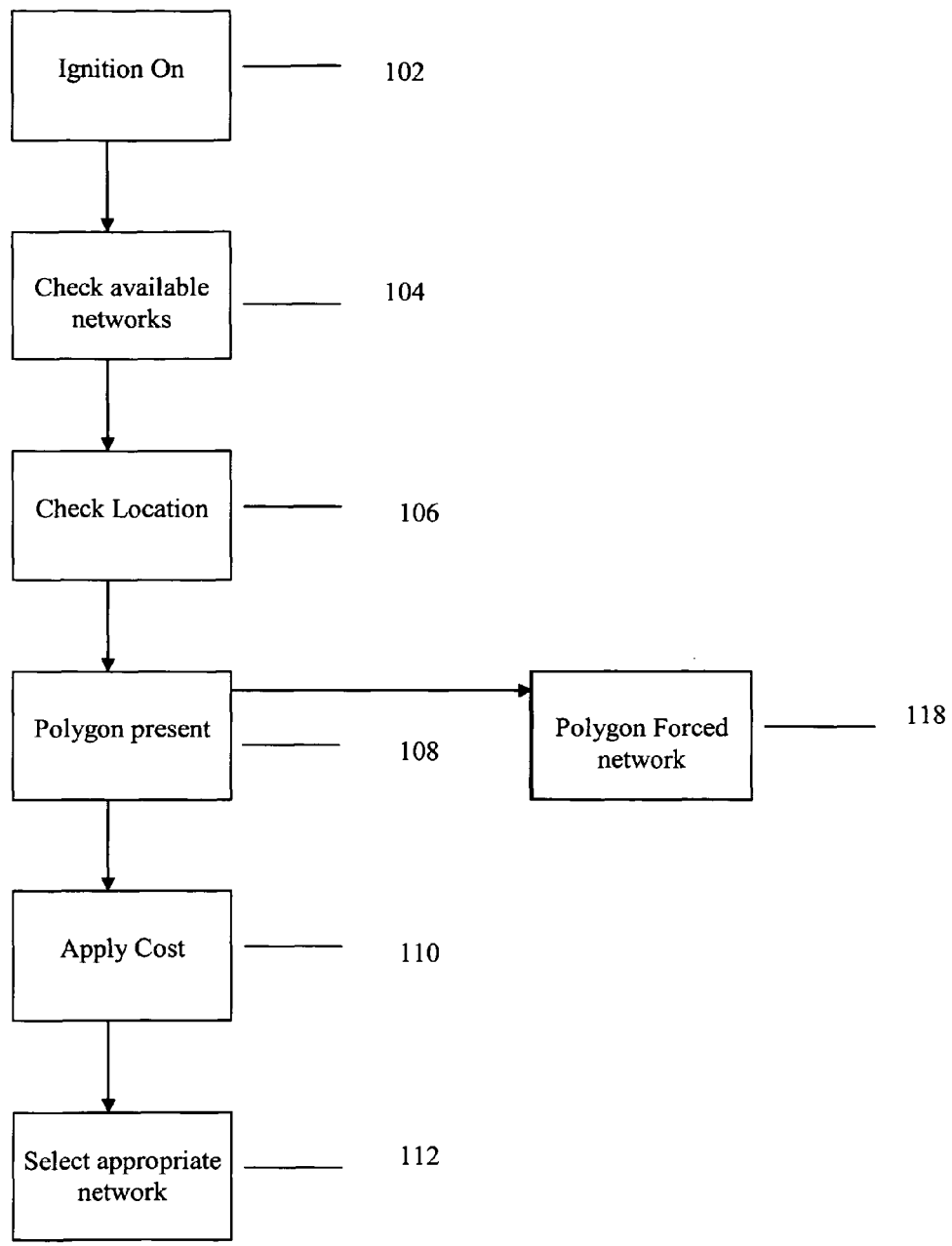
FIG. 2 is a block diagram of the communications method selection rules according to an embodiment of the present invention.

An example of how the parameters are applied is shown in FIG. 2. Once the system is turned on, preferably in combination with the vehicle ignition 102, the system checks the available networks 104. Next, the location of the vehicle is checked 106, preferably by GPS. At this stage, the system determines if the vehicle is located in a polygon 108, and if so, forces the system to use the network associated with that polygon 118. Polygons are uniquely mapped and assigned to represent the two dimensional coverage area of particular communication methods along route segments that vehicles travel.

If there is no polygon present, then the monetary cost parameters are applied 110 and the appropriate network is selected 112. The systems then continues to carry out these steps on an ongoing basis, changing the network as required, either by the parameters, or when entering an area where a polygon is present The parameter sequence can be run as often as desired, and may be controlled to run less often to reduce method switching in areas where that would otherwise take place. Also, the existence of the polygons to force network selection allows for the system to stop cycling beyond checking polygon status once the entry into a polygon has been established.

Another feature that can be provided is an override setting for use in emergencies or similar situations to manually enable a specific communications method for a specific purpose. For example, an alarm override can be provided that sets the communication method to a 911-enabled cellular phone or VoIP network to permit the appropriate authorities to be summoned.

This concludes the description of a presently preferred embodiment of the invention. The foregoing description has been presented for the purpose of illustration and is not intended to be exhaustive or to limit the invention to the precise form disclosed. It is intended the scope of the invention be limited not by this description but by the claims that follow.

What is claimed is:

1. A communications system for a mobile vehicle, comprising:
   a) a vehicle mounted communications module for operating communications hardware used by said vehicle to communicate with a dispatch station; and
   b) a logic module, containing a set of user-defined parameters, said parameters including signal strength, range, bandwidth, vehicle class, and a location of a vehicle along route segments that said vehicle travels, and coverage area polygons mapped and assigned to represent a two-dimensional coverage area of a particular communication method along route segments that said vehicle travels, said logic module checking available networks for said vehicle, determining if the location of said vehicle is within one of said coverage area polygons and selecting the communication method used by said vehicle for communication with the dispatch station from the available networks for said vehicle and at least partially based on if said vehicle is also within one of said coverage area polygons, and wherein each vehicle class is able to communicate with the dispatch station via two or more communication methods, and selecting the communication method used by said vehicle is at least partially based on a vehicle class of the vehicle and switches communications methods dynamically as required by the set of user defined parameters as required by a vehicle operator.

2. The system of claim 1, further comprising:
   c) a GPS module for determining the location of said vehicle.

3. The system of claim 1 wherein selecting a communications method used by said vehicle is at least partially based on whether the vehicle is in a depot, as checked by a GPS location of the vehicle.

4. The system of claim 1 wherein if the location of said vehicle is determined to be within one of said polygons then using the selected communication method until said vehicle is no longer within the one of said polygons.

5. The system of claim 1 wherein if the location of said vehicle is determined to not be within one of said polygons then selecting a communication method based on the user-defined parameters and continuing the determining if the location of said vehicle is within one of said polygons.

6. The system of claim 1 wherein the set of user-defined parameters are set for a vehicle or class of vehicles and determined by the needs of the transit authority.

7. The system of claim 6 wherein user-defined parameters of regular route buses are set to operate with the communications method with a lowest monetary cost condition and specialized vehicles are set to operate with the communications method with maximum signal strength and reception condition, regardless of monetary cost factors.

8. The system of claim 1 wherein the set of parameters further comprises an alarm override parameter that sets the communication method to a 911-enabled cellular phone.

9. The system of claim 1 wherein the vehicle is a regular route bus and the polygons of GPS coordinates are along routes segments that the regular route bus travels.

10. The communication system of claim 1, wherein said polygons are determinative of the communications method selected.

11. A method of providing communications for a mobile vehicle, comprising:
    a) providing an ability to communicate with a dispatch station using a number of different communications methods;

b) establishing a set of user-defined parameters, said parameters including signal strength, range, bandwidth, vehicle class, and coverage area polygons mapped and assigned to represent a two-dimensional coverage area of a particular communication method along route segments that the mobile vehicle travels;
c) checking available networks for said vehicle;
d) determining, by the mobile vehicle, if the location of said vehicle is also within one of said coverage area polygons; and
e) selecting the communications method for communication with a dispatch station from the available networks for said vehicle and at least partially based on the results of said determining, wherein each vehicle class is able to communicate with the dispatch station via two or more communication methods, and said selecting is at least partially based on a vehicle class of the vehicle and switches communications methods dynamically as required by the set of user defined parameters as required by a vehicle operator.

12. The method of claim 11, wherein a manual override is provided to enable a user to select one of said communications methods regardless of the results of said selecting.

13. The method of claim 11, wherein said polygons are determinative of the communications method selected.

14. The method of claim 11, further comprising:
e) determining the location of said vehicle using GPS.

15. The method of claim 11 wherein said selecting is at least partially based on whether the vehicle is in a depot, as checked by a GPS location of the vehicle.

16. The method of claim 11 further comprising:
e) if said vehicle was determined to be within one of said polygons, checking polygon status; and
f) maintaining the selected communications method until checking polygon status indicates said vehicle is not within one of said polygons.

17. The method of claim 11 further comprising:
e) if said vehicle was determined not to be within one of said polygons, selecting a communications method based on said user-defined parameters; and
f) checking polygon status until checking polygon status indicates said vehicle is within one of said polygons and the re-selecting a communications method at least partially based on the results of said checking.

* * * * *